United States Patent
Littau et al.

(10) Patent No.: US 8,535,502 B2
(45) Date of Patent: Sep. 17, 2013

(54) SYSTEM AND METHOD FOR RECOVERY OF $CO_2$ BY AQUEOUS CARBONATE FLUE GAS CAPTURE AND HIGH EFFICIENCY BIPOLAR MEMBRANE ELECTRODIALYSIS

(75) Inventors: Karl A. Littau, Palo Alto, CA (US); Francisco E. Torres, San Jose, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 1060 days.

(21) Appl. No.: 12/206,424

(22) Filed: Sep. 8, 2008

(65) Prior Publication Data

US 2010/0059377 A1    Mar. 11, 2010

(51) Int. Cl.
B01D 61/54 (2006.01)
B01D 61/46 (2006.01)

(52) U.S. Cl.
USPC ........... 204/528; 204/529; 204/531; 204/534; 204/537; 204/538; 204/631

(58) Field of Classification Search
USPC ................. 204/528, 529, 531, 534, 537, 538, 204/631
See application file for complete search history.

(56) References Cited

U.S. PATENT DOCUMENTS

| | | | |
|---|---|---|---|
| 3,344,050 A * | 9/1967 | Mayland et al. | 205/555 |
| 4,238,305 A * | 12/1980 | Gancy et al. | 204/538 |
| 4,584,077 A | 4/1986 | Chlanda et al. | |
| 4,592,817 A | 6/1986 | Chlanda et al. | |
| 4,636,289 A | 1/1987 | Mani et al. | |
| 4,740,281 A | 4/1988 | Chlanda et al. | |
| 4,969,983 A | 11/1990 | Parsi | |
| 4,995,956 A * | 2/1991 | Mani | 204/522 |
| 5,281,317 A | 1/1994 | Mani et al. | |
| 7,632,387 B1 * | 12/2009 | Hryn et al. | 204/525 |

FOREIGN PATENT DOCUMENTS

| | | |
|---|---|---|
| CN | 101043929 A | 9/2007 |
| DE | 4235125 A1 | 4/1994 |
| EP | 0286143 A1 | 10/1998 |
| WO | 2006036396 A2 | 4/2006 |

OTHER PUBLICATIONS

EP Search Report, EP Application No. 09168023.1-2113, Search Dated Mar. 2, 2010, Munich.
Nagasawa et al., Carbon Dioxide Recovery from Carbonate Solutions by an Electrodialysis Method, 7 pgs, (2007).
Ramirez et al., Membrane Potential of Bipolar Membranes, Elsevier Science S.A., Journal of Electroanalytical Chem. 404 (1996) pp. 187-193.

(Continued)

Primary Examiner — Arun S Phasge
(74) Attorney, Agent, or Firm — O'Brien Jones, PLLC

(57) ABSTRACT

A system and method for recovery of $CO_2$ includes an aqueous capture device having a capture solution. The aqueous capture device is arranged to receive gas and to capture components from the gas including at least $CO_2$. An electrodialysis unit in operative connection with the capture device performs an electrodialysis operation on the capture solution including at least the $CO_2$, wherein a $CO_2$ rich process stream and a regenerated capture solution are generated from the capture solution including at least the $CO_2$. The $CO_2$ rich process stream is a pressurized process stream at a pressure which maintains the $CO_2$ substantially within the $CO_2$ rich process stream, while in the electrodialysis unit. In another alternative, at least the pH of the capture stream is controlled.

13 Claims, 5 Drawing Sheets

(56) References Cited

OTHER PUBLICATIONS

Xu, Development of Bipolar Membrane-Based Processes, Elsevier Science S.A., Desalination 140 (2001) pp. 247-258.

Alcaraz et al., Ion Selectivity and Water Dissociation in Polymer Bipolar Membranes Studied by Membrane Potential and Current-Voltage Measurements, Elsevier Science S.A., Polymer 41 (2000) pp. 6627-6634.

Sonin et al., Ion Transport Through Layered Ion Exchange Membranes, The Journal of Physical Chemistry, vol. 76, No. 26, 1972, pp. 3996-4006.

Huang et al., Application of Electrodialysis to the Production of Organic Acids: State-of-the-Art and Recent Developments, Elsevier Science S.A., ScienceDirect, Journal of Membrane Science, 2006, 12 pgs.

Gavis et al., Kinetics of Carbon Dioxide Uptake by Phytoplankton at High pH, Limnology and Oceanography, Mar. 1975, vol. 20(2), pp. 211-221.

Green et al., Carbon Dioxide Capture From Flue Gas Using Dry Regenerable Sorbents, Quarterly Technical Progress Report, Research Triangle Institute, Louisiana State University, Oct. 2001, pp. 1-24, Appendix A.

Acid Gas Purification Techniques for CO2 (carbon dioxide) Benfield Process, Air Pollution Control Technology in Japan, Exhaust Gas Treatment Equipment, Kobe Steel, Ltd., http://www.gec.jp/AIR/data/Air-208.html, Mar. 25, 2008, 2 pgs.

Portielje et al., Carbon Dioxide Fluxes Across the Air-Water Interface and Its Impact on Carbon Availability in Aquatic Systems, American Society of Limnology and Oceanography, Inc., Limnology and Oceanography, v. 40(4), 1995, pp. 690-699.

European Office Action in related European Patent Application No. 09168023.1-2113, dated Oct. 16, 2012.

Third Party Observation filed by anonymous party in related European Patent Application No. 09168023.1-2113, dated Jan. 22, 2013.

Third Party Observation filed by Kevin Kirchman in related European Patent Application No. 09168023.1-2113, dated Jan. 22, 2013.

First Office Action in related Chinese Patent Application No. 200910169599.0, dated Jan. 29, 2013.

English language translation of First Office Action in related Chinese Patent Application No. 200910169599.0, dated Jan. 29, 2013.

European Office Action in related European Patent Application No. 09168023.1-2113, dated Feb. 13, 2013.

\* cited by examiner

SYSTEM AND METHOD FOR RECOVERY OF CO₂ BY AQUEOUS CARBONATE FLUE GAS CAPTURE AND HIGH EFFICIENCY BIPOLAR MEMBRANE ELECTRODIALYSIS

BACKGROUND

The present application is directed to carbon capture and regeneration, and is more particularly directed to solvent based capture and regeneration of $CO_2$ generated from fossil fuel fed electricity generating facilities, coal gasification plants or other sources.

While solvent based capture techniques hold promise they are not without drawbacks. Capture and regeneration energy efficiencies are still low in relation to what is desired for power plant flue gas extraction, pre-combustion gas extraction from coal gasification plants, and extraction of $CO_2$ from other sources. Solvent cost and degradation of system components have also been identified as concerns. Still further, the potential emission of the solvents and solvent degradation byproducts need to be addressed.

Inorganic aqueous methods of $CO_2$ capture have certain advantages and are used where process conditions allow, and the value of the product is sufficiently high to justify the increased cost. One particular type of inorganic aqueous method is known as the Benfield high temperature aqueous $KCO_3$ capture system. This process is appropriate where organic solvent use is not desired and cost is not problematic. The Benfield system is one of the solvent capture technologies commonly used in Natural Gas and Petroleum Refining industries for $CO_2$ removal.

While the aqueous capture of $CO_2$ taught by the Benfield system is fast and efficient, the energy consumed during regeneration is large and pressurization of the input gas stream is required making it unattractive for flue gas capture. Therefore, alternate, more efficient systems and methods of aqueous solvent regeneration are needed.

One particular innovation in the area of aqueous capture of $CO_2$ is the employment of Bipolar Membrane Electrodialysis (BPMED), which has been used in acid/base recovery and/or other conditioning of waste streams. BPMED takes advantage of the natural dissociation of water into hydroxyl and hydronium ions in the presence of an external field to generate separate acidic and basic aqueous streams. BPMED has been investigated for use in $CO_2$ recovery from flue gas by Nagasawa, et al., in the publication, Nagasawa, H, Yamasaki, A., Yanagisawa, Y, NETL-Sixth Annual Conference on Carbon Capture & Sequestration (2007), which is hereby incorporated by reference in its entirety.

Turning to FIG. 1 illustrated is a system 100 for $CO_2$ and alkaline solution recovery from alkaline carbonate solution employing an electrodialysis system and method such as proposed by Nagasawa, et al.

In implementing an electrodialysis $CO_2$ recovery process in accordance with the system of FIG. 1, the following reactions occur in an aqueous solution of an alkaline carbonate ($M_2CO_3$) in contact with $CO_2$ in the gas phase:

$$CO_2 + H_2O \leftrightarrow H_2CO_3 \qquad (1)$$

$$H_2CO_3 \leftrightarrow H^+ + HCO_3^- \qquad (2)$$

$$HCO_3^- \leftrightarrow H^+ + CO_3^{2-} \qquad (3)$$

The equilibrium could be shifted to the left-hand side to increase the $CO_2$ partial pressure either by increasing the temperature or adding protons (i.e., decreasing pH) into the system. The former mechanism corresponds to a thermal recovery process of $CO_2$ from carbonate solutions. The process to be described corresponds to the latter mechanism. Particularly, the protons can be supplied by the dissociation of water molecules, as in:

$$H_2O \leftrightarrow H^+ + OH^- \qquad (4)$$

Prior to being able to recover $CO_2$ protons need to be separated from hydroxyl ions and then be supplied to a feed solution. Next, to keep electro-neutrality of the solution, alkaline metal ions in the feed solution should be removed. The removed hydroxyl ions and alkaline metal ions will form the alkaline solution that can be reused for $CO_2$ absorption.

To achieve the above process, and as shown in system 100 of FIG. 1, a base cell 102 and a feed cell 104 are sandwiched by two bipolar membranes 106, 108 and one cation exchange membrane 110. The other sides of the bipolar membranes 106, 108 being placed in contact with a respective cathode electrode cell 112 and anode electrode cell 114, where electrodes 116, 118 are inserted in corresponding electrolyte solution 120, 122. A carbonated alkaline solution 124 is fed through feed cell 104, and an electrolyte solution 126, with the same cation as alkaline solution 124, is fed through base cell 102. The release $CO_2$ is shown at 128.

Cation exchange membranes are a type of ion exchange membrane that can exclusively transport cations. The bipolar membrane has a laminated structure of two layers, a cation exchange layer and an anion exchange layer (not shown individually).

When an electric potential difference larger than the electrodialytic splitting voltage of water is applied via a power source (not shown) to electrodes 116, 118, the bipolar membrane 108 splits water molecules into pairs of proton (H+) and hydroxyl ions (OH—). The produced protons are transported into feed cell 104 according to the potential difference. At the same time, the alkaline metal ions (M+) in feed cell 104 are transported into base cell 102 through cation exchange membrane 110. As a result, the pH of the feed solution is decreased, and $CO_2$ gas is generated from the solution according following mechanism:

$$CO_3^{2-} + H^+ \rightarrow HCO_3^- \qquad (3')$$

$$HCO_3^- + H^+ \rightarrow H_2CO_3 \qquad (2')$$

$$H_2CO_3 \rightarrow CO_2\uparrow + H_2O \qquad (1')$$

On the other hand, bipolar membrane 106 in contact with base cell 102 supplies hydroxyl ions (OH—) to the base cell, where the alkaline solution is regenerated with the alkaline metal ions (M+) transported from feed cell 104. The regenerated alkaline solution can be reused for $CO_2$ capture from exhaust gas.

Electrodialysis is a potentially energy-saving process because it can be operated near thermodynamic minimum energy consumed. However, the process efficiency will be significantly reduced by the electrolysis processes in the electrode cells. For example, some part of the electric power will be consumed for producing oxygen and hydrogen gases at the dialysis cell electrode terminals.

However, the amortized energy consumption of the electrolysis will be reduced and the efficiency of the process improved by increasing the number of the pairs of feed cells and the base cells between two electrodes. More particularly, the power consumed by electrolysis ($H_2$ and $O_2$ formation at the electrode terminals) is constant at constant current irrespective of the number of pairs of feed cells and base cells between the two electrodes. With an increase in the pair of the base and feed cells, the energy consumed by electrolysis per each cell will be decreased.

However, there are drawbacks to the system described by Nagasawa et al. Among the obstacles to employing BPMED technology in the recovery of $CO_2$ has been the potential for the physical degradation of the system due to operational concerns, such as evolving of the $CO_2$ while in the cells, as well as capital and operating cost, such as energy costs due to uncontrolled system pH. These drawbacks are not fundamental and it is therefore considered useful to present improvements to existing concepts to overcome these limitations to carbonate/bicarbonate extraction and $CO_2$ concentration.

SUMMARY

A system and method for recovery of $CO_2$ includes an aqueous capture device having a capture solution. The aqueous capture device is arranged to receive gas and to capture components from the gas including at least $CO_2$. An electrodialysis unit in operative connection with the capture device performs an electrodialysis operation on the capture solution including at least the $CO_2$, wherein a $CO_2$ rich process stream and a regenerated capture solution are generated from the capture solution including at least the $CO_2$. The $CO_2$ rich process stream is a pressurized process stream at a pressure which maintains the $CO_2$ substantially within the $CO_2$ rich process stream, while in the electrodialysis unit. In another alternative, at least the pH of the capture stream is controlled.

DETAILED DESCRIPTION

I). System Process Flow

Figure 1:
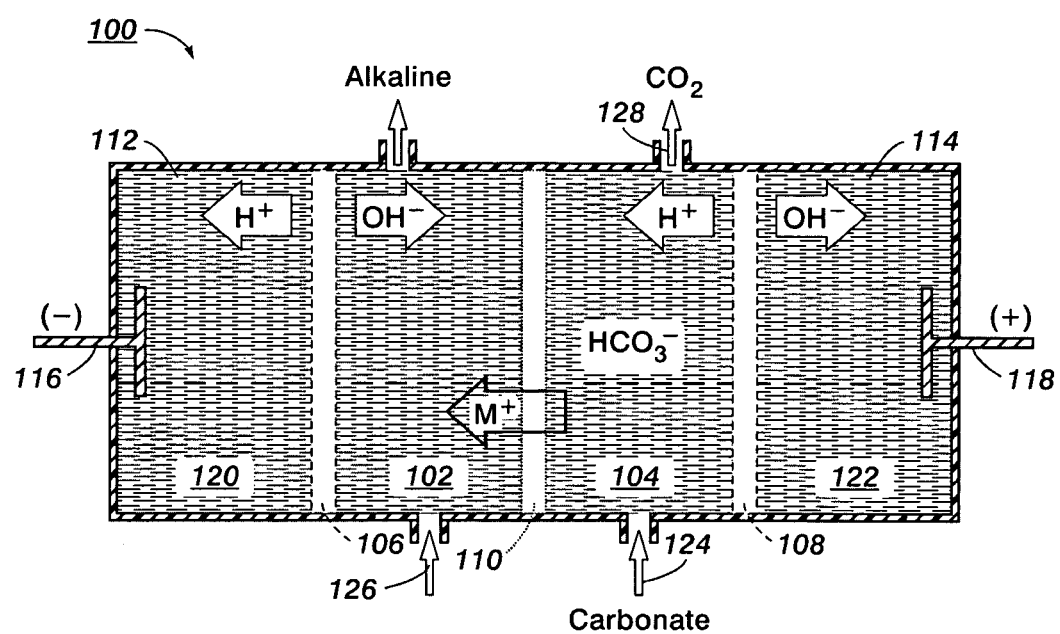
FIG. 1 is a schematic block diagram representing a $CO_2$ and alkaline solution recovery system from alkaline permanent solution with an electrodialysis method.
Figure 2:
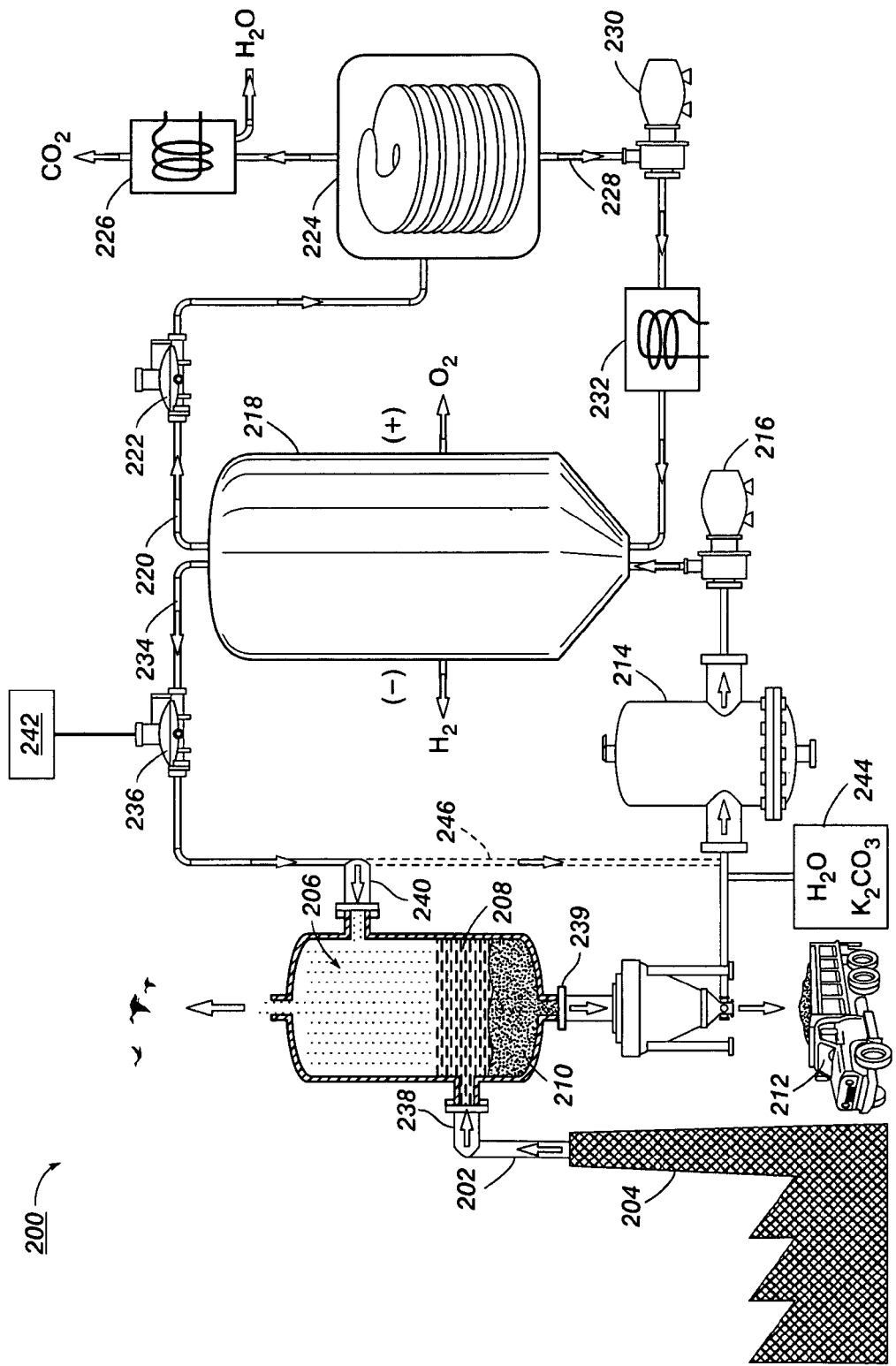
FIG. 2 is a process flow schematic incorporating concepts according to the present application.

Turning now to FIG. 2, illustrated is a process flow schematic 200 incorporating concepts of the present application, which for example overcome shortcomings of a system such as depicted in FIG. 1. More particularly, FIG. 2 is a closed loop aqueous capture and high pressure bipolar membrane electrodialytic regeneration system. It is to be appreciated that while FIG. 2 depicts an embodiment of a system incorporating concepts of the present application, the disclosed concepts are equally applicable to and may be used in systems having components and flows other than those shown in FIG. 2. Also, while this section introduces concepts of the present application the sections that follow expand on those introduced concepts.

Initially, air and/or other gas 202 from a $CO_2$ producing plant 204 is passed through an aqueous capture device such as a spray tower 206, at ambient conditions, i.e., at the conditions consistent with that of the incoming air and/or gas. As is well known in the art, an optional pretreatment of the gas (not shown in FIG. 2) to remove environmental contaminants such as $SO_2$, Hg, $NO_x$, and solid particulates (ash) may be undertaken.

Spray tower 206 consists of a counter flow of a 10-50% aqueous $K_2CO_3/KHCO_3$ solution, where a capture solution 208 is collected in a basin 210. At this point the capture solution has captured and includes components contained in the flue gas and/or air from the atmosphere, including at least $CO_2$. Solids 212 coming out of spray tower 206 are separated and removed from the capture solution 208. Next, the capture solution 208 (with the remaining components of the flue gas and/or air) is pumped to an ion exchange facility 214, such as a divalent cation exchange, where divalent cations are removed. In embodiments, trivalent and higher order multivalent ions are also removed. This is done to remove multivalent cations which can be harmful to the dialysis membrane materials. The capture solution 208 is then pressurized to 2-200 atm by a pressurization pump 216 and introduced into a bipolar membrane electrodialysis unit 218. At this point the system has controlled the pH in the capture solution such that the capture solution has a known pH prior to entering the electrodialysis unit.

Within electrodialysis unit 218 (which may be constructed in some embodiments in configurations corresponding to FIGS. 3, 4 and 5), capture solution 208 is partially depleted of bicarbonate through electrodialysis. The bicarbonate is transferred to a buffered $CO_2$ rich process stream 220 held at a constant pH between about 3.0 and 4.0. This high pressure $CO_2$ rich process stream 220 is transferred via P-regulator 222 to a gas evolution/separation tank 224 where the pressure is reduced with concomitant release of $CO_2$. Condenser 226 is then used to remove water vapor from the released $CO_2$. The $CO_2$ is then pressurized to approximately 2000 PSI, and the $CO_2$ is ready for storage and/or transport.

In some embodiments, it may be desirable to not condense the solution, but rather it may be useful to just form liquid carbonate solution and ship it for storage or sequestration. Also, in embodiments, the $CO_2$ rich process stream is to be understood to have a concentration of $CO_2$ which is at least twice the concentration of dissolved $CO_2$ in the capture stream.

The now $CO_2$ depleted process stream 228 is returned to the electrodialysis unit 218 via a re-pressurization pump 230 and a heat exchanger 232, while a regenerated $K_2CO_3/KHCO_3$ flue gas capture solution 234 is returned, via P-regulator 236 to spray tower 206. The $CO_2$ rich process stream 220 and the capture solution 208 are kept separate within the electrodialysis unit 218.

It is to be understood that as used herein, stating the regenerated capture solution is depleted, partially depleted and/or substantially depleted of $CO_2$ means the amount of $CO_2$ which has been removed from the air and or other gas 202 generated from $CO_2$ producing plant 204 (or from another source) is sufficient to achieve a desired amount of $CO_2$ removal. For example, in one embodiment the desired amount of $CO_2$ removal may be obtained when 10% or more of the $CO_2$ is removed from the air and/or other gas 202.

As mentioned here and as will be expanded upon in later sections, a particular aspect of the present system is that it adds pressure to the capture solution and acts to control the pH values in the system.

With attention to control of the pH, existing implementations of bipolar membrane electrodialysis (BPMED) systems in other areas have generally operated with uncontrolled pH. Since bipolar membrane electrodialysis systems are very good at generating acids and bases, if they are not regulated, such systems will in a very short time essentially decrease to 1 or 0 pH on the acid side, and reach a very base condition on the base side. Therefore a pH difference of, for example, 14 can occur very quickly in an unregulated system. This is particularly undesirable when BPMED is applied to $CO_2$ retrieval, as such a high pH differential increases the energy which must be used to perform the electrodialysis process.

To address this issue the present system and method monitors and controls the pH values. To accomplish this system 200 includes monitors to sense various characteristics of the process. For example, a $CO_2$ monitor 238 senses the amount of $CO_2$ entering spray tower 206, and a pH monitor 240 senses the pH value of capture solution 208 coming out of spray tower 206. Using the readings from monitors 238 and 240, the system adjusts process operations to ensure a desired pH value is maintained.

For example the flow rate of the capture solution can be increased or decreased depending upon the amount of $CO_2$ which is being received into spray tower 206. Increasing and/or decreasing the flow rate of process steams can be accomplished by a number of different mechanisms which are well known in the art. In one embodiment P-regulator 236 is placed in operative association with a controller 242 which also receives signals from at least one of monitors 238, 239 and 240. Based on the received information from monitors 238 and 240, controller 242 adjusts operation of P-regulator 236 to increase and/or decrease the flow of regenerated capture solution 234 into spray tower 206. The signals may be transmitted by any know means such as hardwire connections and/or wirelessly. For example in this figure controller 242 is shown with a hardwire connection to P-regulator 236, whereas communication between the monitors 238, 239 and 240 and controller 242 is wireless.

It is of course to be understood the above is but one embodiment of how the pH values can be monitored and controlled in system 200, and other monitors and methods of control could also be used. For example in another embodiment if it is determined the pH of the capture solution that has come out of the spray tower needs to have additional capture solution, a makeup stream 244 (of for example potassium carbonate) may be added to the stream of capture solution 208, after it has left the spray tower, e.g., prior to capture solution 208 entering ion exchange facility 214. In still another embodiment the regenerated stream from P-regulator 236 may be diverted from spray tower 206, via appropriate valve arrangements, to capture solution 208, as shown by dotted line 246. Again these are only some examples of how to maintain the pH at desired levels, and others not mentioned here may also be employed.

II.) Spray Tower Absorption.

Turning now to an expanded discussion of the capture of $CO_2$, such capture in aqueous pure and promoted carbonate/bicarbonate solutions has been researched for nearly 100 years. The kinetics and energetics of non-promoted and promoted capture reactions are well understood, and are discussed in detail in Tseng, P. C., Ho, W. S., Savage, D. W., AIChE Journal Vol. 34, No. 6 (1988) 922-931. (and references therein), and Lee, Y., Noble, R. D., Yeomb, B. Y., Park, Y. I., Lee, K. H., Journal of Membrane Science 194 (2001) 57-67, each hereby incorporated by reference in their entireties.

Thus pure aqueous kinetics and energetics for dilute solutions which are relevant for a system such as described in this application are given in Table I below:

TABLE I

Kinetic data on Aqueous $CO_2$ absorption.

| | |
|---|---|
| $CO_2 + OH^- \rightleftharpoons HCO_3^-$ | 9400 l mol$^{-1}$ s$^{-1}$ at 25° C. |
| | K = 4.30 × 10$^7$ |
| $CO_2 + H_2O \rightleftharpoons HCO_3^- + H^+$ | 0.039 s$^{-1}$ at 25° C. |
| | K = 4.20 × 10$^{-7}$ |

It is also to be understood, while FIG. 2 employs a spray tower for aqueous capture, many other known aqueous capture devices and methods can be used including but not limited to packed towers, Venturi scrubbers, and hollow fiber membranes, among others. While the use of promoters is often used in closed systems which can prevent solvent loss, pure aqueous carbonate capture is feasible especially where the low $CO_2$ loading of the carbonate solvent can be tolerated. Flow rates and sizing of components and streams will depend on the type of facility and details of the construction; however flow rates for carbonate capture are in the range that can be accommodated by larger gas/liquid facilities.

Solvent (water) loss in system such as described in FIG. 2 would be kept to a minimum. In flue gas capture the high dew point of the flue gas stream would keep evaporative losses low. Because the BPMED regeneration is sensitive to divalent ions such as $Ca^{2+}$, the construction of the spray tower would be managed to limit their dissolution. Particularly, appropriate polymer coatings inside the tower and other fluid handling components may be required.

III) High Pressure Bipolar Membrane Electrodialysis Regeneration

As mentioned, the regeneration of carbonate/bicarbonate streams via electrodialysis has been demonstrated on the laboratory scale. In addition to the previously mentioned Nagasawa, et al., see also, Chlanda, F. P., Mani, K. N., "Electrodialytic Water Splitting Process for Gaseous Products," U.S. Pat. No. 4,592,817, June 1986; Chlanda, F. P., Mani, K. N., "Process for Recovering Sodium Carbonate from Trona and Other Mixtures of Sodium Carbonate and Sodium Bicarbonate," U.S. Pat. No. 4,584,077, April 1986; and Chlanda, F. P., Mani, K. N., "Solution Mining of Sodium Minerals with Acids Generated by Electrodialytic Water Splitting," U.S. Pat. No. 4,636,289, January 1987, each herein incorporated by reference in their entirety.

Deficiencies of these existing processes include degradation of the membranes due to bubble formation inside the membrane stack caused by release of the $CO_2$ from the capture solution. This bubble formation within the membrane stack leads to current crowding and local heating. In addition, low conductivity of the solutions and poor mixing of the process streams leads to high internal resistances, excessively high potentials, and reduced efficiencies inside the membrane stacks.

The membrane stacks, which can be purchased commercially, are typically square meter sheets approximately 1 meter by 1 meter where the membranes are approximately 1 mm apart or even smaller if possible. The formation of bubbles causes degradation and destruction of the membrane stack since the bubbles tend to choke off the ionic transfers, which provide the ionic current. Thus instead of the desired current path, due to bubble formation the ionic current tends to go around the bubbles causing local heating on the membrane which eventually destroys the membrane. It is also not possible to remove the bubbles quickly and efficiently in such stacks.

To counter this situation, the present application performs substantial portions of the process at a high pressure. Particularly, it is known that $CO_2$ will dissolve in water, and the higher the pressure the more it will dissolve. So by running the dialysis operation at above 2 atm, and in a range of 2-200 atm and preferably 30 atm or higher, it is possible to substantially suppress $CO_2$ bubble formation in the membrane stack, maintaining the $CO_2$ substantially within the $CO_2$ rich process stream, meaning that $CO_2$ gas formation in the stack is minimized or eliminated. This pressure is hydrostatic pressure, so the electrodialysis reaction will still occur (i.e., the $CO_2$ will come into the membrane stack and become acidified), but it will stay in a solution form as long as the concentration of $CO_2$ is kept at or above a threshold below which the bubbles would otherwise form. It is similar in analogy to maintaining carbonation in soda water, when the soda water is kept under pressure. Therefore the pressure is maintained at a high level in the stack of membranes and only downstream from the membrane stack does the process reduce the pressure. Then the capture solution becomes effervescent and $CO_2$ comes out of the capture solution stream.

In discussing system 200 of FIG. 2, it has been described that pressure is provided by use of pressurization pump 216. It is to be appreciated this is but one location and/or manner of adding pressure in the described system. Alternatively, the aqueous capture device itself may be pressurized or pressure adding sources may be provided at locations different from the location of pressurization pump 216. Still further, while it has been described that pressure is applied to the capture stream, the concepts herein are directed to maintaining the $CO_2$ in a solution. Therefore, the present concepts may also be described by noting the $CO_2$ rich process stream is a pressurized process stream at a pressure which maintains the $CO_2$ substantially within the $CO_2$ rich process stream. This language emphasizes, irrespective of how pressure is added in the system, $CO_2$ is maintained in a solution state in the system to achieve the benefits described herein.

In a particular implementation, the minimum threshold of pressure that needs to be applied to the $CO_2$ rich process stream to ensure the $CO_2$ substantially remains in the $CO_2$ rich process stream is 5% above that of the calculated pressure value. In some embodiments this pressure is applied to the $CO_2$ rich process stream via a pressure applied to the capture solution. Of course, if a system is able to regulate the pressure in the system in a more precise manner, the minimum value could be closer to the calculated value.

Another aspect of the present application which has previously been mentioned is the need to control the pH of the system. By controlling the system pH a more energy efficient regeneration is achieved. The pH issue is related to issues of thermodynamics. Particularly, the bipolar membrane generates acid and base from water splitting. The electrodialysis stack uses the natural disassociation of water and drives the hydroxyl anions toward the anode, and drives the hydrated proton cations across the cation exchange portion of the bipolar membrane toward the cathode.

The energy associated with this process is directly related to the pH difference across the bipolar membrane. For example, if on the cation half the pH was 7 and on the anion side the pH was also 7, the incremental energy it would take to move one proton from one side to the other (i.e., from the middle of the membrane to the cation side or for hydroxyl on the other side) is infinitesimally small. However, if there is a situation where one side is pH 0 and the other side is pH 14, the energy required to perform the process is much higher.

As an example, if the difference between the two sides is pH 14, then when multiplied by 0.06 (since there is a 0.05 to 0.06 difference in voltage per pH unit per side required for splitting water) roughly a little less than one volt (or 14×0.06=0.84v) is needed to perform the process. In existing systems since the pH is not controlled it is common that a minimum of a little less than about one volt is required for every bipolar membrane in a membrane stack. This can lead to large amounts of energy as these membrane stacks can have one hundred (100) or more bipolar membranes.

The above discussion therefore illustrates the benefits of regulating the pH of the two sides of the membranes to be what they need to be for the concentrations being used.

On the acid side pH control is dependent on the pressure at which the gas is evolved. Therefore, it is desirable to keep the pH just above the point where the $CO_2$ would come out of solution (see Table II for example values). This way the system uses the minimum energy that is needed for the process. As an example drawn in part from Table II, in one case the control will go down to about pH 3 or a little higher and on the base side the pH will be about pH11, resulting in a difference in the pH of about 8. It is understood the needed voltage is linearly proportional to the pH difference. Therefore going from a 14 pH difference to a 7 or 8 pH difference lowers the required voltage from a little less than 1 volt to about 0.5 volts, cutting almost in half the (voltage×current) energy that is required to operate the process at a given current. Again, this is for only one membrane, and each stack may have a hundred or more such membranes.

It is also useful to employ the solution as a buffered solution as there are potential situations where the pH locally can run very low or very high. So even though the bulk of the solution may be at a desired pH, if the solution is not mixed well and has very little buffer capacity, high or low local pH areas may exist, and to overcome these local pH issues additional energy must be expended as before. So it is beneficial to have a good buffer capacity to keep the pH at the desired level. Another aspect to improve operation of the system is to ensure the flow rate of the solution, or the nature of the flow rate, is optimized to obtain maximum mixing to avoid high or low local pH. Small buffer molecules may be advantageous as they are good for mixing, and will minimize the boundary layer at the surface of the membranes.

Thus the present application describes a method and system for efficient solvent regeneration by realizing low voltages at reasonable current densities while restricting gas evolution in the membrane stack.

Figure 3:
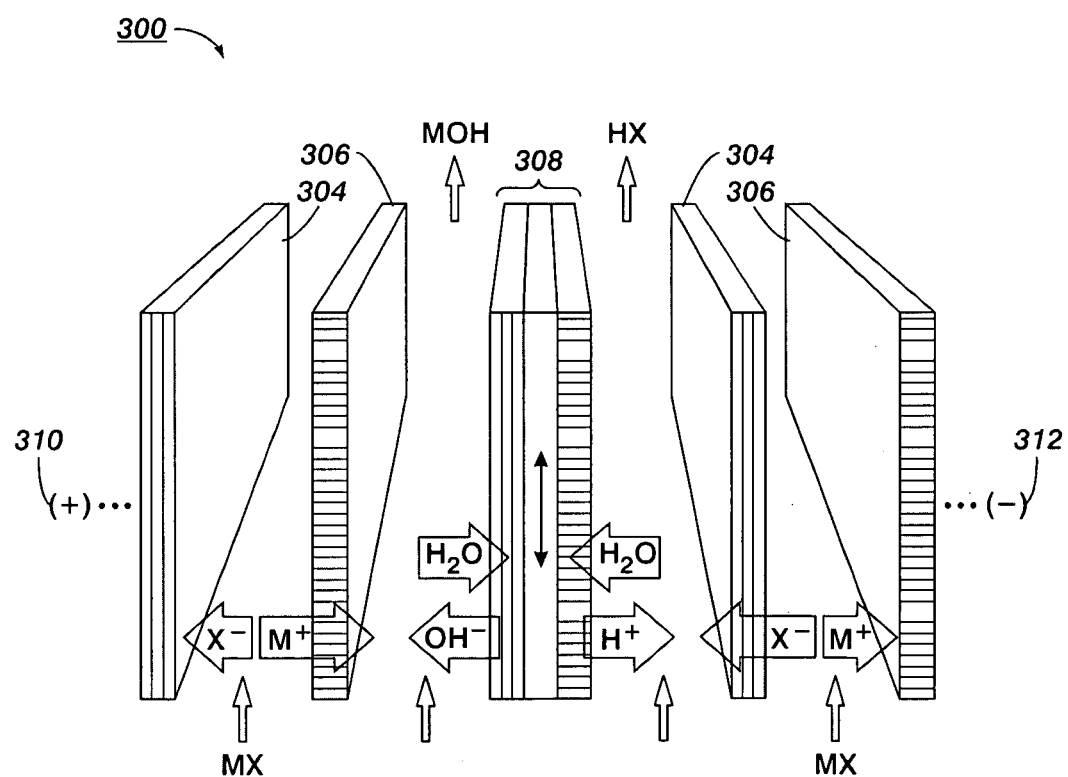
FIG. 3 depicts a three layer bipolar membrane electrodialysis stack which may be used in the system of FIG. 2.
Figure 5:
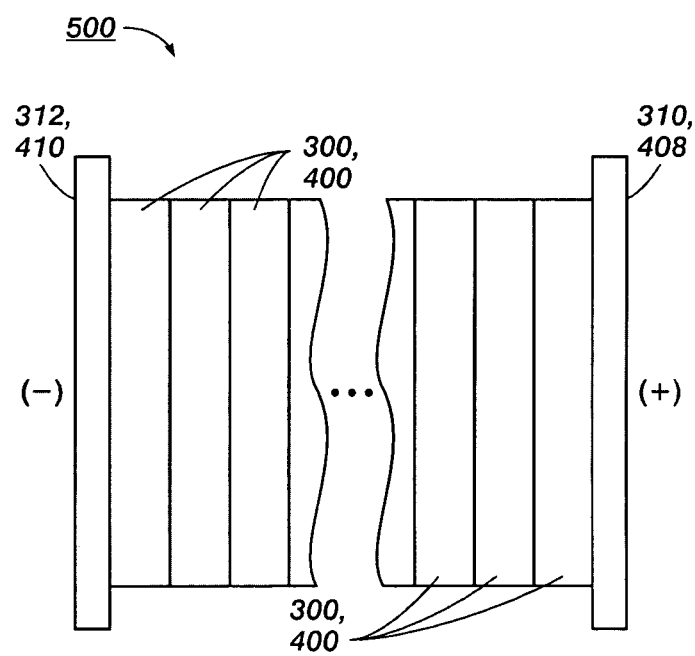
FIG. 5 is a bipolar membrane stack incorporating cells such as described in FIGS. 3 and 4.

With continuing attention to high pressure bipolar membrane electrodialysis regeneration, attention is now directed to FIG. 3, which is a schematic representation of a commercially available three layer bipolar membrane electrodialysis membrane cell arrangement 300 designed to handle high pressure, that may be incorporated into a larger membrane cell stack 500 configuration such as depicted in FIG. 5. Such a membrane cell arrangement stack may be used in the recovery of acid and base from waste salt streams. While physically substantially similar as commercially available membranes formed in a membrane cell stack, chemically they are different as there is a buffer in the capture solution which has been depleted of $CO_2$, where the buffer is a chemical moving through the system. A stack, such as shown in FIG. 5, is buffered in advance of the electrodialysis process to ensure appropriate coverage.

The structure of the membrane cell arrangement 300 of FIG. 3 is similar to membrane discussed in FIG. 1, but with additional structure, and consists of anion exchange membranes 304, cation exchange membranes 306, and bipolar membrane 308. Current supplied at anode 310 and cathode 312, which represent a source of power, is transferred through stack 300 and, when employed in stack 500, across many repeating units of dialysis membrane cell arrangements 300. A plurality, including one hundred or more repeating membrane cell units, can be constructed in a single dialysis membrane stack. In this way only 1-2% or less of the total potential is consumed at the terminal electrodes (i.e., anode 310, cathode 312) through $H_2$ and $O_2$ formation. The value of the $H_2$ and $O_2$ produced is comprehended in a detailed cost analysis. A salt stream, MX (e.g., $KHCO_3$ or $K_2CO_3$) is brought between each anion exchange membrane 304 and cation exchange membrane 306 where the developed cell potential drives transport of the ions across their respective transport layers. Hydronium and hydroxyl ions are supplied at the surface of the bipolar membrane layers creating acidic and basic product streams HX and MOH respectively. This process has been shown to have high current efficiency in a wide range of applications and unit cell potentials close to the theoretical limit, See: Huang, C., Xu, T., Zhang, Y., Xue, Y., Chen, G., Journal of Membrane Science 288 (1-2), (2007), Pages 1-12, incorporated herein in its entirety.

Figure 4:
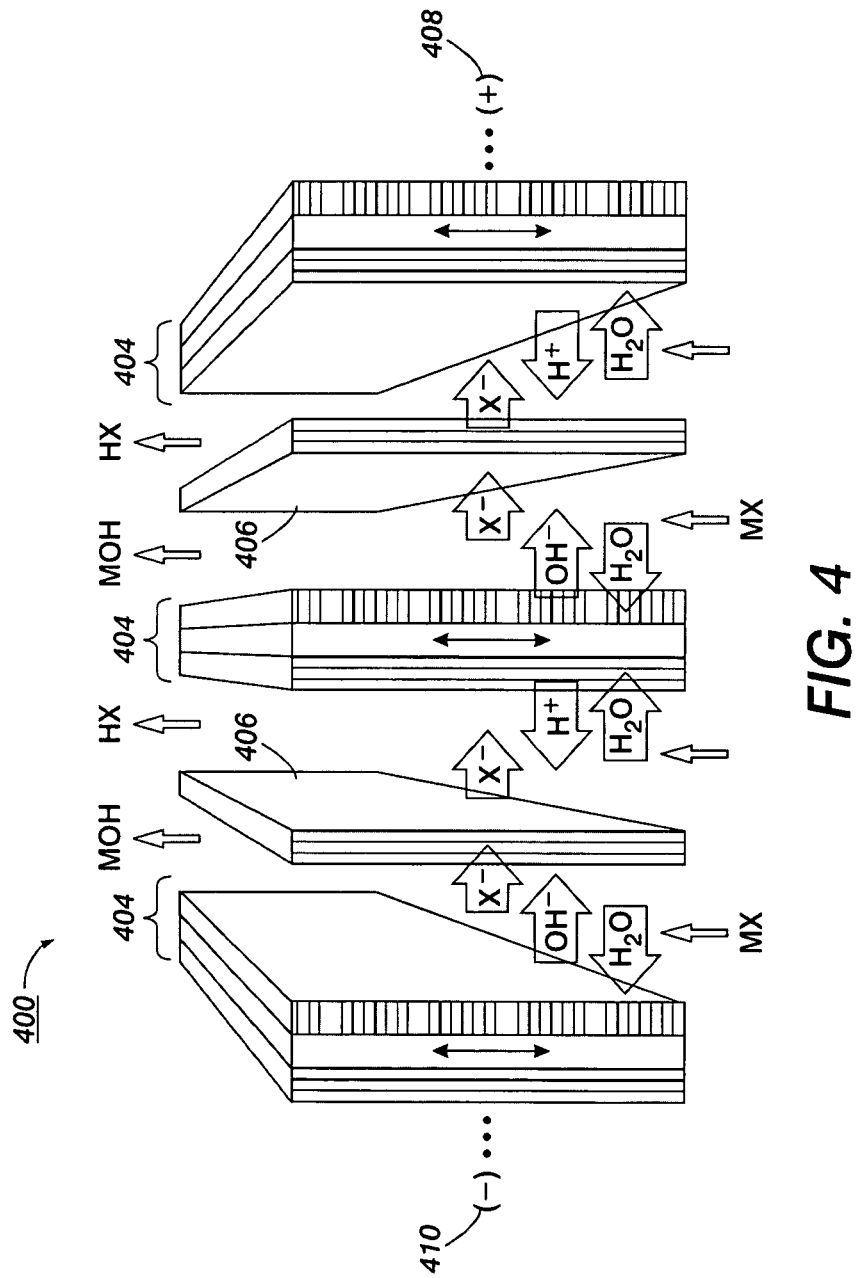
FIG. 4 depicts an alternative two layer cell configuration bipolar membrane electrodialysis stack which can be used in connection with concepts of the system of FIG. 2.

FIG. 4 shows a membrane cell arrangement 400 for the method and system of the present application having an alternate cell configuration different from membrane cell arrangement 300 of FIG. 3. The design of membrane cell arrangement 400 is in the form bipolar membranes 404 on each side of anion exchange membranes 406. A plurality, for example in one embodiment including one hundred or more repeating membrane cell arrangements designed in this fashion, can be constructed in a single dialysis membrane stack such as stack 500, with an anode 408 and cathode 410 which represent a source of power.

In the arrangements of FIGS. 3 and 4 when used in a system such as described in connection with FIG. 2, potassium bicarbonate/carbonate solution is brought from the spray tower, pressurized to suppress $CO_2$ bubble formation, and is injected into membrane cell arrangements (300, 400) as the salt MX. The bicarbonate/carbonate is transported across the anion exchange layer (304, 406) into the output process stream which is buffered to a pH 3-4. The buffering is maintained by the concentrations of components and by maintaining an adequate flow rate. The bicarbonate/carbonate $CO_2$ capture solution is regenerated by the hydroxyl ion flux from the bipolar membrane while the outputted $CO_2$ rich process stream (the HX stream in the figures) absorbs hydronium ion flux. The capture solution is buffered against excessive pH increases by the presence of significant bicarbonate ion (pH 8-10). The pH of the $CO_2$ rich process stream is optionally regulated with acidic buffers and by maintaining an adequate flow rate, preventing excessively low pH (target~pH 3-4). The regenerated capture stream is returned to the spray tower while the $CO_2$ process stream is sent to the gas evolution and separation tank. The gas evolution and separation tank is held at slightly reduced pressure (yet still greater than atmospheric) allowing $CO_2$ to evolve. It is taken from the tank, dried, and compressed further for transportation and storage. The depleted process stream is returned and pumped through the membrane stack to repeat the cycle. Constant monitoring of the pH of the process stream having the capture solution and other process streams ensures that only the minimum potential is required for electrodialysis, thereby maximizing energy efficiency.

IV) System Performance and Operating

Unlike traditional solvent systems, aqueous based carbonate absorption and BPMED regeneration does not require process steam to regenerate the solvent, nor is it sensitive to solvent loss. The solvent (water and bicarbonate) is inexpensive, extremely stable under operating conditions, and has low toxicity. Carbon capture at ambient temperatures and pressures is feasible although the somewhat elevated temperature resulting from the hot flue gas or pressurized gas streams (where already available) may be advantageous. Contaminants such as $H_2S$, $SO_2$ and NOx will be hydrolyzed to some extent in the carbon capture spray tower and will enter the carbon capture effluent stream. These anionic contaminants may reduce the capacity of the carbon capture tower which would require make-up solvent. The regeneration cost is managed by providing appropriate membrane operating conditions and process control dependent on particular installation characteristics.

The regeneration power required is a function of the current utilization and cell potential in electrodialysis. Current utilization in BPMED can be 80-90% depending on operating conditions. For reactions involving water splitting across a bipolar membrane, the theoretical membrane potential for large fixed charge is related to the concentration gradient. This concept is discussed for example in Ramirez, P, Mafe, S, Manzanares, J A, Pellicer, J., J Electroanal Chem 1996; 404: 187; and Alcaraz, A. et al. Polymer 41 (2000) 6627-663, each hereby incorporated by reference in their entirety, and wherein such concepts may be exemplified as:

$$\phi_M = \frac{RT}{F} ln\left[\frac{H_r^+}{H_l^+} + \frac{H_l^+}{H_r^+}\right] \quad (5)$$

or equivalently at room temperature $$\emptyset M = (0.059V)\Delta pH \quad (6)$$

where in the first equation (5) R is the gas constant, T is the thermodynamic temperature and F is the Faraday constant, and in the second equation (6), $\Delta pH$ is the pH difference across the bipolar membrane.

Typically in bipolar membrane electrodialysis, the hydronium and hydroxyl ion concentrations are near unit activity. This leads to pH differentials of over 14, cell potentials of approximately 1V or higher and large power consumption. However, as can be seen in the above equations, if the pH's of the solutions are regulated, the cell potential can be reduced.

TABLE II

Selected values of pH and pressure for saturated $CO_2$ solutions

| pH | Pressure (atm) | [$CO_2$] (mol/l) |
|---|---|---|
| 4.4 | 0.1 | $3.4 \times 10^{-2}$ |
| 3.9 | 1.0 | $3.4 \times 10^{-2}$ |
| 3.7 | 2.5 | $8.4 \times 10^{-2}$ |
| 3.4 | 10 | 0.34 |
| 2.9 | 100 | 3.4 |

In the case of using BPMED for regeneration of bicarbonate/carbonate streams, the system will operate near the saturation condition for $CO_2$. Table II shows the relationship between pH and pressure for saturated $CO_2$ solutions. At elevated operating pressure, the pH of the carbonate solution will range from 3-4. The pH of the carbonate/bicarbonate $CO_2$ capture stream will be a compromise between the capture rate and desire to buffer the solution to favor $HCO_3^-$ over $CO_3^{2-}$ in the dialysis cell. In one situation where the system is optimized for energy efficiency, the capture stream will be approximately pH 8-9. In this case the cell will operate at a potential of approximately 0.23-0.35 V. It is to be understood however the capture solution could be controlled to be more acidic or more basic. For example, the capture stream could be controlled to a pH 10-12. In this situation the capture rate would be higher and the spray tower could be smaller, but the regeneration energy would need to be larger.

V) System Capacity and Capital

The capacity of the system will be limited by the size of the spray tower absorption system and effective membrane area in the BPMED cell stacks. With appropriate regulation of the conductivities of the electrolytic solutions, current densities of 50-100 mA/cm² are feasible in such systems.

The invention claimed is:

1. A system for recovery of $CO_2$ comprising:
an aqueous capture device including a capture solution, the aqueous capture device arranged to receive gas and to capture components from the gas including at least $CO_2$;
an electrodialysis unit in operative connection with the capture device to perform an electrodialysis operation on the capture solution including at least the $CO_2$; and
monitors for monitoring pH of the system,
wherein:
a $CO_2$ rich process stream and a regenerated capture solution are generated from the capture solution including at least the $CO_2$, the regenerated capture solution being sent back to the aqueous capture device,
the $CO_2$ rich process stream is a pressurized process stream at a pressure which maintains the $CO_2$ in a solution state substantially within the $CO_2$ rich process stream, while in the electrodialysis unit,
the $CO_2$ rich process is a buffered process stream having a pH ranging from about 3 to 4 while in the electrodialysis unit, and
the capture solution is a buffered process stream having a pH ranging from about 8 to about 10 while in the electrodialysis unit.

2. The system according to claim 1 wherein the system is a closed loop system.

3. The system according to claim 1, further including a controller to control the flow rate of the capture solution, dependent on signals provided from the monitors.

4. The system according to claim 1 wherein the electrodialysis unit is a bipolar membrane electrodialysis unit.

5. The system according to claim 1, wherein the aqueous capture device is a pressure aqueous capture device, which operates at a pressure high enough for operation of the electrodialysis unit, which is a bipolar membrane electrodialysis unit.

6. The system according to claim 1, further including, a gas evolution/separation tank in operative connection with the electrodialysis unit and configured to receive the $CO_2$ rich process stream, the $CO_2$ rich process stream being at least partially de-pressurized and $CO_2$ gas being removed, the $CO_2$ depleted process stream being sent back to the electrodialysis unit.

7. The system of claim 1, wherein:
the capture solution is an aqueous carbonate/bicarbonate solution, MX;
the electrodialysis unit comprises at least one membrane capable of transporting carbonate/bicarbonate ions; and
the electrodialysis unit is configured so as to transport carbonate/bicarbonate ions $X^-$ from the capture solution across the at least one membrane into the $CO_2$ rich process stream.

8. A method for recovering $CO_2$ comprising:
receiving, in an aqueous capture device, a gas;
capturing at least portions of the gas including at least $CO_2$ by a capture solution in the aqueous capture device;
performing an electrodialysis operation on the capture solution by an electrodialysis unit; and
monitoring at least the pH of the capture solution and the $CO_2$ rich process stream,
wherein:
a $CO_2$ rich process stream and a regenerated capture solution are generated from the capture solution including at least $CO_2$,
the $CO_2$ rich process stream is a pressurized process stream at a pressure which maintains the $CO_2$ in a solution state substantially within the $CO_2$ rich process stream while in the electrodialysis unit,
the $CO_2$ rich process stream is a buffered process stream having a pH ranging from about 3 to about 4 while in the electrodialysis unit, and
the capture solution is a buffered process stream having a pH ranging from about 8 to about 10 while in the electrodialysis unit.

9. The method according to claim 8, further including:
moving the regenerated capture solution back to the aqueous capture device, the regenerated capture solution being substantially depleted of $CO_2$;
at least partially de-pressurizing the $CO_2$ rich process stream by a gas evolution/separation tank to remove $CO_2$ from the process stream; and
moving the $CO_2$ depleted process stream back through the electrodialysis unit.

10. The method according to claim 9 wherein a pressure is applied to the capture solution which is sufficient to substantially eliminate evolving of the $CO_2$ from the $CO_2$ rich process stream while the $CO_2$ rich process stream is being processed by the electrodialysis unit.

11. The method according to claim 8 wherein the pressure of the $CO_2$ rich process stream is between 2-200 atm.

12. The method according to claim 8 further providing a buffered process stream within the electrodialysis unit.

13. The method of claim 8, wherein:
the capture solution is an aqueous carbonate/bicarbonate solution, MX;
the electrodialysis unit comprises at least one membrane capable of transporting carbonate/bicarbonate ions; and
the electrodialysis unit is configured so as to transport carbonate/bicarbonate ions $X^-$ from the capture solution across the at least one membrane into the $CO_2$ rich process stream.

* * * * *